(12) United States Patent
Nielson et al.

(10) Patent No.: US 7,454,118 B2
(45) Date of Patent: Nov. 18, 2008

(54) EXPANDED BEAM OPTICAL ATTENUATOR

(75) Inventors: Jeffrey D. Nielson, Wylie, TX (US);
Matthew Cruz, Council Buffs, IA (US);
Joseph C. Livingston, Frisco, TX (US);
Scott L. Lowe, Conover, NC (US)

(73) Assignee: Commscope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 11/765,312

(22) Filed: Jun. 19, 2007

(65) Prior Publication Data
US 2007/0292099 A1    Dec. 20, 2007

Related U.S. Application Data

(60) Provisional application No. 60/814,551, filed on Jun. 19, 2006.

(51) Int. Cl.
*G02B 6/00* (2006.01)
(52) U.S. Cl. ...................................... 385/140
(58) Field of Classification Search ................... 385/140
See application file for complete search history.

(56) References Cited

U.S. PATENT DOCUMENTS

| | | | |
|---|---|---|---|
| 4,261,640 A | 4/1981 | Stankos et al. | 385/140 |
| 4,461,537 A | 7/1984 | Raymer, II et al. | 385/88 |
| 5,136,681 A * | 8/1992 | Takahashi | 385/140 |
| 5,187,768 A * | 2/1993 | Ott et al. | 385/140 |
| 6,256,446 B1 * | 7/2001 | Brunsting et al. | 385/140 |
| 6,311,010 B1 * | 10/2001 | Medeiros | 385/140 |
| 6,456,774 B1 * | 9/2002 | Lin | 385/140 |
| 6,483,982 B1 * | 11/2002 | Takahashi | 385/140 |
| 6,501,900 B1 * | 12/2002 | Aloisio et al. | 385/140 |
| 6,512,878 B1 * | 1/2003 | Chang | 385/140 |
| RE38,205 E * | 7/2003 | Loughlin et al. | 385/140 |
| 6,856,750 B2 * | 2/2005 | Chang | 385/140 |

FOREIGN PATENT DOCUMENTS

| | | | | |
|---|---|---|---|---|
| JP | 02195307 A * | 8/1990 | | 385/60 |
| JP | 03282504 A * | 12/1991 | | 385/140 |

* cited by examiner

*Primary Examiner*—Sung Pak
*Assistant Examiner*—Daniel Petkovsek
(74) *Attorney, Agent, or Firm*—Muncy, Geissler, Olds & Lowe, PLLC

(57) ABSTRACT

An attenuator for optical signals includes a base. A first ferrule has a first optic fiber passing through a central bore therein and attached to a first lens at an end of the first ferrule. The first ferrule is fixed in position relative to the base. A second ferrule has a second optic fiber passing through a central bore therein and attached to a second lens at an end of the second ferrule. The second lens faces the first lens. The second ferrule is fixed to the base and can be moved relative to the base by a user adjustment feature, so that the second lens may be moved relative to the first lens. The relative placement between the first and second lens controls the attenuation of the attenuator.

20 Claims, 5 Drawing Sheets ant disc. Scratches can cause the light signal to scatter, reflect# EXPANDED BEAM OPTICAL ATTENUATOR This application claims the benefit of U.S. Provisional Application No. 60/814,551, filed Jun. 19, 2006, the entire contents of which are herein incorporated by reference.

BACKGROUND OF THE INVENTION

1. Field of the Invention

The present invention relates to fiber optic communications. More particularly, the present invention relates to an attenuator capable of attenuating a light intensity of a signal carried by a fiber optic cable.

2. Description of the Related Art

Attenuators for fiber optic signal communications are known in the background art. A typical attenuator, such as used with a physical contact (PC) type connector, is formed as a clear glass or plastic disc. Generally, a connector of the fiber optic cable has a ferrule and the light transmitting optic fiber passes through a center of the ferrule to a polished end. When the connector is attached to a piece of equipment the polished end of the ferrule, with the light carrying optic fiber end thereat, is placed adjacent to a receiving detector lens or matching ferrule of the equipment.

If the light intensity is too great and needs to be attenuated, a clear or coated glass disc or plastic disc is inserted between the polished end of the connector ferrule and the receiving ferrule of the equipment. Attenuation occurs because of the increased spacing between the polished end of the connector ferrule and the receiving ferrule of the equipment, or perhaps also because of an absorption of light by the disc.

U.S. Pat. No. 4,261,640, which is herein incorporated by reference, illustrates an embodiment of the prior art attenuator. As illustrated in FIGS. 1-3, the prior art attenuator includes a cylindrical light absorbing filter disc 10, coupled between a first optic fiber 12 and a second optic fiber 14. The coupling is done so that an end 16 of the first optic fiber 12 is adjacent to a first surface 18 of the filter disc 10, while an end 20 of the second optic fiber 14 is adjacent to a second surface 22 of the filter disc 10. The first and second surfaces 18 and 22 are parallel to one another so that the facing ends 16 and 20 of the optic fibers can be directly in line with one another to insure maximum light transfer between them.

The coupling is accomplished by means of layers of a matching gel 24 and 25 which are coated respectively on the first and second surfaces 18 and 22 of the filter disc 10. First and second ferrules 26 and 27 are provided around each of the optic fibers 12 and 14, respectively, for protective purposes. The first ferrule 26 might be incorporated into a connector at the end of a patch cord, whereas the second ferrule 27 might be incorporated into a jack on a piece of equipment. The filter disc 10 may be manufactured at a certain thickness and/or with a certain tinting so as to absorb a given amount of light to attenuate an optical signal by a prescribed dB level.

Referring now to FIG. 2, a close-up exploded view of the first and second ferrules 26 and 27 incorporated into a connector and a jack, respectively, is shown. A first fiber optic cable 44 has the first optic fiber 12 terminated to the first ferrule 26, which is housed within a connector housing 28. The second optic fiber 14 within the second ferrule 27 is held in a jack housing 30. The filter disc 10 is located in a depression 32 in an end surface 34 of the connector housing 28 so that the first surface 18 of the filter disc 10 rests on a recessed surface 36 formed by the depression 32. The second surface 22 of the filter disc 10 faces outward from the connector housing 28 toward the jack housing 30. To provide for secure holding, the shape of the depression 32 should conform to the shape of the filter disc 10.

As can be seen from FIG. 3, the depth of the depression 32 is also generally set to correspond to the thickness of the filter disc 10 so that the second surface 22 of the filter disc 10 will be even with the end surface 34 of the connector housing 28. The connector housing 28 is also provided with an opening 38 extending along the longitudinal axis of the connector housing 28 from the recessed surface 36 toward an opposite end surface 40 of the connector housing 28. This opening 38 serves to hold the first ferrule 26 with its end 16 abutted against the surface 18 of the filter disc 10. To provide for maximum contact alignment, the opening 38 should be perpendicular to the plane of the recessed surface 36. It should be noted that a portion 42 of the opening 38 is enlarged to accommodate a jacket of the first fiber optic cable 44.

The jack housing 30 is also provided with an opening 46 for holding the second ferrule 27. This opening 46 extends along the longitudinal axis of the jack housing 30 from a recessed end surface 48 of the jack housing 30 facing the end surface 34 of the connector housing 28 toward an opposite end surface 50 of the jack housing 30. And, as in the case of the opening 38, the opening 46 also includes an enlarged portion 52 for a jacket of a second fiber optic cable 53. The second ferrule 27 is held in the opening 46 so that its end 20 is even with the recessed end surface 48.

To hold both the first and second ferrules 26 and 27 securely in their respective openings 38 and 46, set screws 54a, 54b, 56a and 56b are provided to extend through the wall of the housings 28 and 30 to press against the jackets of the first and second fiber optic cables 44 and 53. These set screws 54a, 54b, 56a and 56b prevent both rotational and longitudinal movement of the optic fibers 12 and 14 relative to the housings 28 and 30.

Coupling the first and second housings 28 and 30 together can be conveniently accomplished by using external threading 58 on a cylindrical portion 60 of reduced diameter of the connector housing 28 and matching internal threading 62 along the cylindrical wall leading to the recessed end surface 48 of the jack housing 30.

The filter disc 10 can be readily interchanged simply by decoupling the first and second holders 28 and 30 from one another, removing the filter disc 10 and installing a new filter disc 10 having a different degree of attenuation, and recoupling the first and second housings 28 and 30.

SUMMARY OF THE INVENTION

The Applicants have appreciated drawbacks in the attenuators of the background art.

First, the plastic or glass disc is placed into contact with the polished connector ferrules and hence the ends of the light carrying optic fibers. When such a connector is used in a vibrating environment (such as in vehicles, ships, airplanes, or industrial factory equipment), the vibration between the directly contacting attenuator disc and the polished ends of the ferrules holding the light carrying optic fibers may cause damage to the disc or optic fibers. For example, the vibration can lead to wear, which changes the performance characteristics of the connector, e.g. the dB signal attenuation across the connector changes over time. If the disc is coated and the wear removes the coating, the attenuation can drastically reduce over time. The under attenuated light signal can cause equipment damage and/or signaling errors.

Furthermore, vibration can create scratches in the attenuator disc. Scratches can cause the light signal to scatter, reflect and/or refract. This not only alters the signal attenuation factor of the disc, but can also lead to multi-path distortions (e.g. the same signal taking different paths through the attenuator disc with different time delays), which deteriorates the quality of the signal passing through the connector and can lead to signaling errors.

Moreover, it is difficult to fine tune attenuation of the signal using the disc-type attenuators of the prior art. A technician must choose a "best-fit" attenuator for the situation at hand. Suppose a signal attenuation of 2.35 dB was the optimum attenuation desired by the system designer. If the technician's tool kit includes attenuators with values of 1 dB, 2 dB, 3 dB, etc., then the technician must compromise and select either the 2 or 3 dB attenuator.

Based upon the Applicants' appreciation of the shortcomings in the background art, the Applicants have devised an improved optical attenuator to address one or more of the drawbacks.

An optical signal attenuator in accordance with the present invention includes a base. A first ferrule has a first optic fiber passing through a central bore therein and attached to a first lens at an end of the first ferrule. The first ferrule is fixed in position relative to the base. A second ferrule has a second optic fiber passing through a central bore therein and attached to a second lens at an end of the second ferrule. The second lens faces the first lens. The second ferrule is fixed to the base and can be moved relative to the base by a user adjustment feature, so that the second lens may be moved relative to the first lens. The relative placement between the first and second lens controls the attenuation of the attenuator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
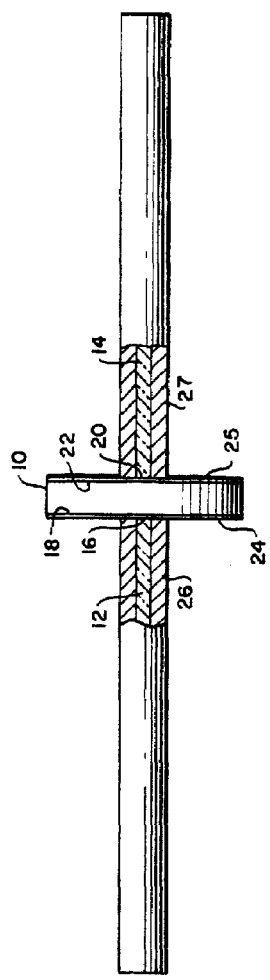
FIG. 1 is a side view, partially in cross section, illustrating a basic concept of the prior art signal attenuator.
Figure 2:
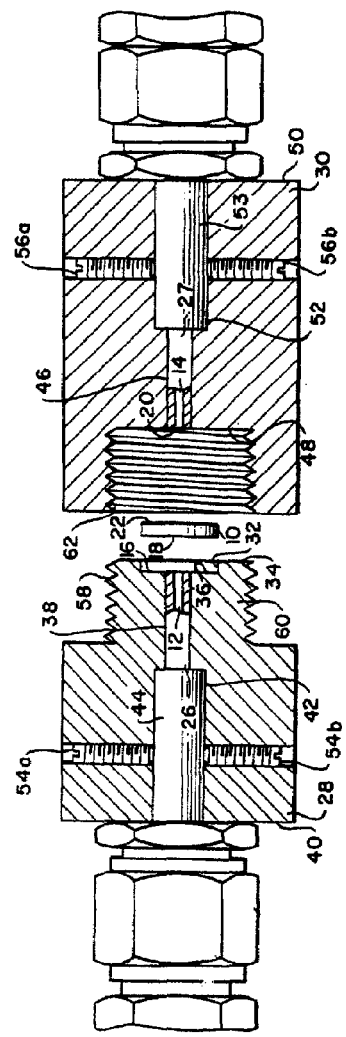
FIG. 2 is a side view, partially in cross section, illustrating parts of an attenuating connector and jack assembly just prior to mating, in accordance with the prior art.
Figure 3:
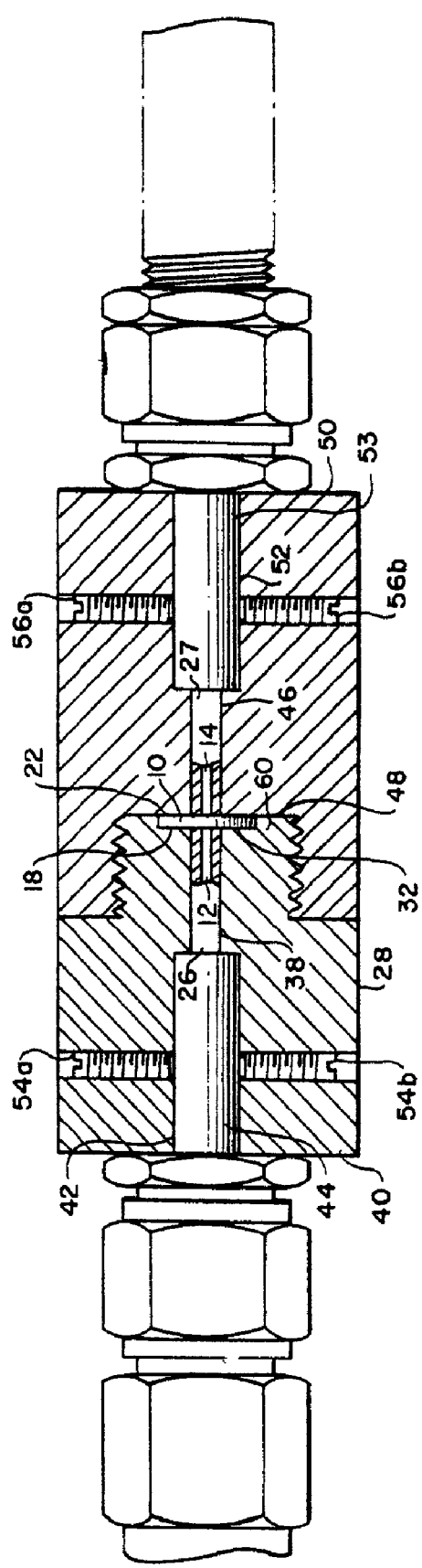
FIG. 3 is a side view, partially in cross section, illustrating the parts of the attenuating connector and jack assembly just after mating, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 4:
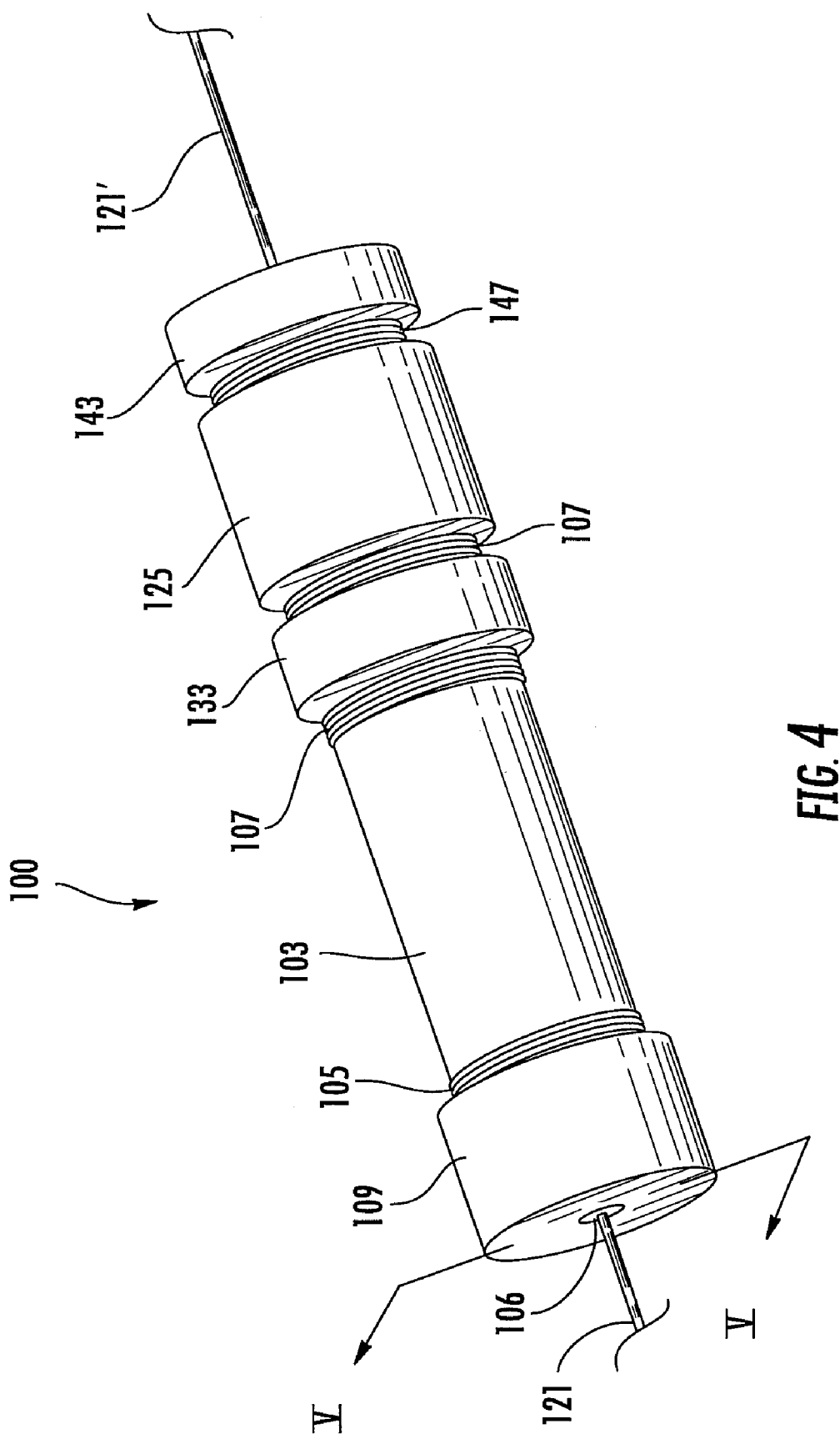
FIG. 4 is a perspective view of an optical attenuator, in accordance with the present invention.

FIG. 4 is a perspective view of an attenuator 100 for optical signals, in accordance with the present invention. The signal attenuator 100 includes a base in the form a cylindrical housing 103. The housing 103 includes external first screw threads 105 at a first end and external second screw threads 107 at a second end.

Figure 5:
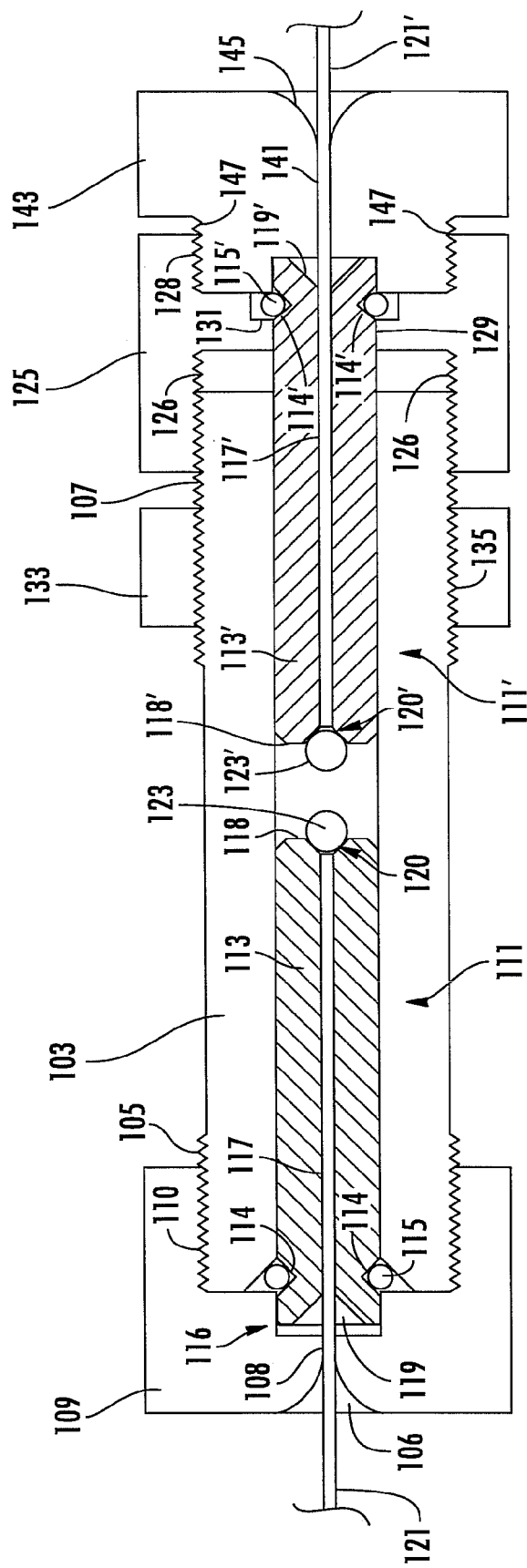
FIG. 5 is a cross section view taken along line V-V in FIG. 4.

As best seen in the cross sectional view of FIG. 5, a first expanded beam terminus 111 is inserted into the first end of the housing 103. The first expanded beam terminus 111 includes a ferrule 113, which may be in the form of a cylinder. A groove or ring 114 is cut into and encircles a perimeter of the ferrule 113. A spring ring or spring clip 115 is seated into the ring 114. Alternatively, the spring clip 115 may be replaced by an o-ring. Alternatively, the ring 114 may be continuously extended to the end of the ferrule 113 to form a reduced diameter portion, and the spring clip 115 may be replaced by a sleeve, which is pressed or bonded to the reduced diameter portion. Such ferrule designs to be used in the attenuator 100 are the subject of Applicants' co-pending U.S. application entitled, "Expanded Beam Connector Concepts," filed on even date herewith, the entire contents of which are herein incorporated by reference.

A bore 117 passes through a center of the ferrule 113. A first end 116 of the ferrule 113 includes a chamfer 119 leading to the bore 117. A second end 118 of the ferrule 113 includes a chamfer 120 leading to the bore 117.

A light carrying optic fiber 121 is guided through a bore 108 of a cap 109 using a chamfer 106 formed in the end of the cap 109. Then, the optic fiber 121 is guided into the bore 117 of the ferrule 113 by the first chamfer 119. The optic fiber 121 passes to the second end 118 of the ferrule 113 where it is attached to a first lens 123. The optical fiber 121 may be MM, SM, graded index, step index, hermetically sealed, protected or strengthened by polymer coatings and/or strength members such as Kevlar. The coatings and strength members may be bonded or fastened to the expanded beam terminus 111.

The first lens 123 may be attached to the optic fiber 121 and the second end 118 of the ferrule 113 by an epoxy, having an index of refraction similar to that of the optic fiber 121 and/or the first lens 123. For example, the value of the index of refraction of the epoxy could be between the values of the indexes of refraction for the optic fiber 121 and first lens 123. In one embodiment, the first lens 123 is a spherical lens made of sapphire or a similar substance. The first lens 123 may be coated with anti-reflective materials The assembled, first expanded beam terminus 111 is inserted into an inner bore of the housing 103. Epoxy may optionally be applied to the ferrule 113 as it is inserted into the housing 103.

The first cap 109 includes internal third screw threads 110 which are screwed onto the first screw threads 105. Screwing the first cap 109 onto the housing 103 fixes the position of the ferrule 113 inside the housing 103 by sandwiching the spring clip 115 between the first cap 109 and an end of the housing 103. Instead of, or in addition to, the first and third screw threads 105 and 110, the first cap 109 may be press fit or crimped onto the first end of the housing 103, or an adhesive or epoxy may be used to secure the first cap 109 onto the housing 103.

A second expanded beam terminus 111' is constructed in identical fashion to the first expanded beam terminus 111. The similar component parts are labeled with the same reference numeral, but with a prime (') notation.

Prior to the optic fiber 121' entering the second expanded beam terminus 111', the optic fiber 121' is passed through a bore 141 using a chamfer 145 in a second cap 143. The primary difference between the second cap 143 and the first cap 109 is that the second cap 143 includes external, fourth screw threads 147.

The second expanded beam terminus 111' is not connected to the housing 103 in the same way that the first expanded beam terminus 111 is connected to the housing 103. The attachment of the second expanded beam terminus 111' will now be described.

A jam nut 133 includes internal, fifth screw threads 135. The fifth screw threads 135 are screwed onto the second screw threads 107 of the housing 103, and the jam nut 133 is screwed up to a point close to the start of the second threads 107.

An adjustable stop 125 includes internal, sixth screw threads 126 and internal seventh screw thread 128. The sixth screw threads 126 are screwed onto the second screw threads 107. A center of the adjustable stop 125 includes a through bore 129. A stop surface 131 exists adjacent to the bore 129. The stop surface 131 may optionally be recessed, as illustrated.

The second expanded beam terminus 111' is inserted through the bore 129 of the adjustable stop 125 and into the housing 103. The second expanded beam terminus 111' is inserted through the bore 129 until the spring clip 115' abuts the stop surface 131.

Finally, the second cap 143 has its fourth screw threads 147 screwed into the seventh screw threads 128, until the spring clip 115' is sandwiched between the second cap 143 and the stop surface 131. Hence, the second expanded beam terminus 111' is fixed to the second cap 143 and adjustable stop 125, which two pieces together form a holder for the second expanded beam terminus 111'.

By examining FIG. 5, it can be seen that the user may select the position of the adjustable stop 125 along the housing 103 by screwing the adjustable stop 125 onto the housing 103 to the desired position. Once, the desired position is selected, the jam nut 133 may be screwed against the adjustable stop 125 to lock the adjustable stop 125 into the desired position.

Moving the adjustable stop 125 on the housing 103 changes a distance between the first lens 123 of the first expanded beam terminus 111 and the facing, second lens 123' of the second expanded beam terminus 111'. The distance between the first lens 123 and the second lens 123' defines the signal attenuation level.

Figure 6:
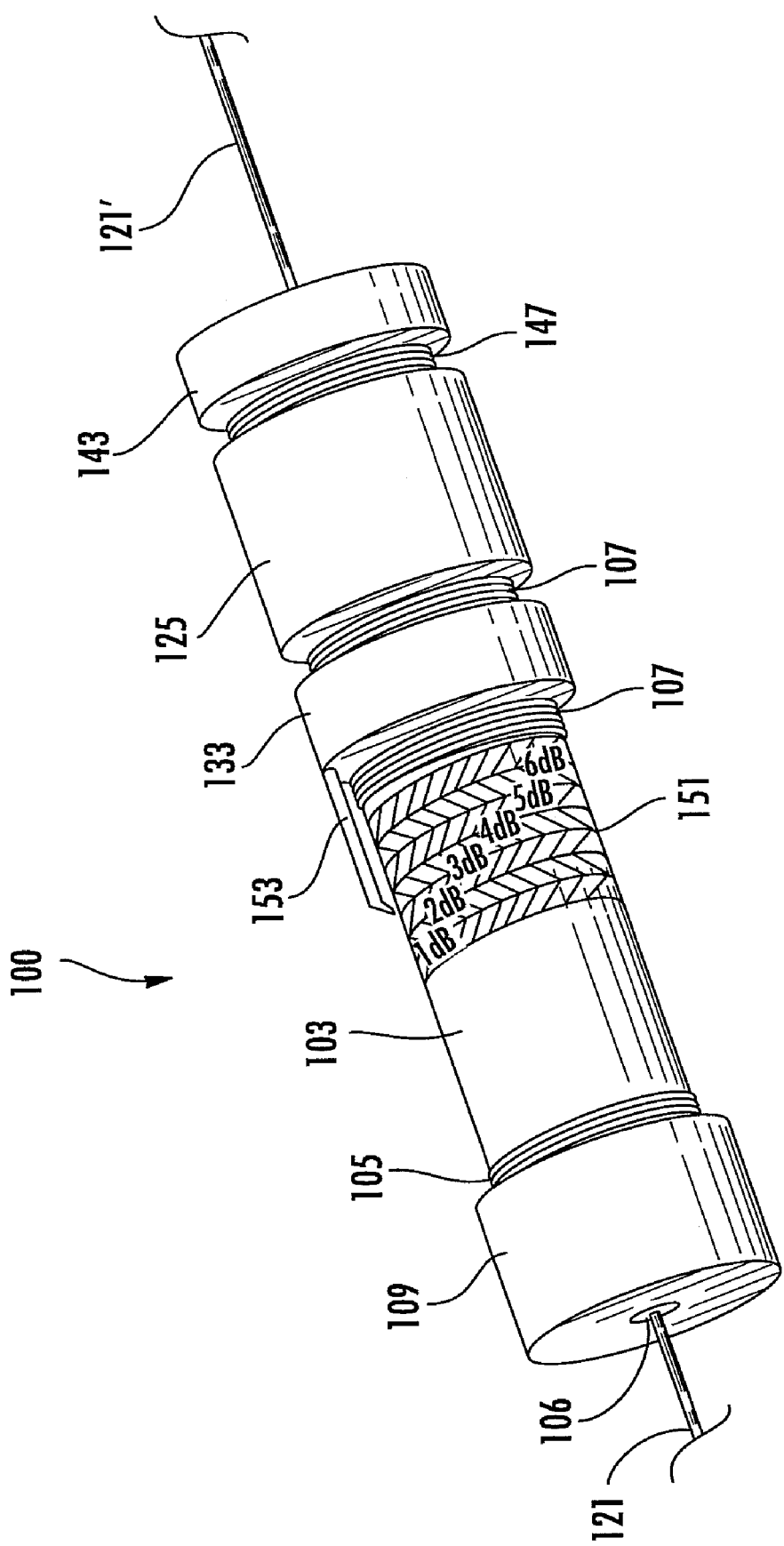
FIG. 6 is perspective view of an optical attenuator with a calibration indicator, in accordance with the present invention.

As illustrated in FIG. 6, the housing 103 may include indicia, such as a scale 151, printed thereon and one or more indicators 153 may be attached to the jam nut 133 and reside above the scale 151. The scale 151 may indicate an approximate attenuation level created by the attenuator 100 if the adjustable stop 125 is position adjacent to the jam nut 133. Alternatively, the indicator 153 may be attached to the adjustable stop 125 and pass over the jam nut 133. Although the scale 151 in FIG. 6 shows particular numerical values increasing at a linear rate, other numerical values could be included on the scale 151 and such other numerical values could increase at rates other than a linear rate.

Also, it is envisioned that attenuation measurements could be taken on site by a technician. Thereby, the adjustable stop 125 would be adjusted by the technician until the desired attenuation was obtained.

Attenuation of the signal is minimized when a certain distance exists between the first and second lens 123 and 123'. As the distance between the first and second lens 123 and 123' is made closer the attenuation of the signal increases. Likewise, as the distance between the first and second lens 123 and 123' is increased, the signal attenuation increases. The certain distance between the first and second lens 123 and 123' where the minimum signal attenuation occurs is dependent upon the lens shape and/or material composition. In a preferred embodiment, sapphire spherical lens are employed, however other shapes and types of lens may be employed. With the preferred embodiment sapphire spherical lens, the minimum signal attenuation has been found to occur with a distance of about 15 to 30 thousandths of an inch between the first and second lens 123 and 123'.

Although the first and second expanded beam terminus 111 and 111' are illustrated as having identical constructions, it would be possible for the second expanded beam terminus 111' to be constructed differently as compared to the first expanded beam terminus 111. The housing 103 may be constructed of materials such as metal, ceramic, polymers or composites and may have shapes other than cylindrical. In the illustrated and preferred embodiment, the relative placement between the lens 123 and 123' is adjusted by changing a linear distance between the lens 123 and 123'; however, it is within the scope of the invention that the relative placement between the lens 123 and 123' could be changed by varying an angle between the lens 123 and 123', while staying within the scope of the appended claims.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. An attenuator for optical signals comprising:
   a base;
   a first ferrule having a feature to hold a first optic fiber;
   a second ferrule having a feature to hold a second optic fiber; and
   a holder moveably attached to said base, said holder engaging said second ferrule, such that said holder permits a user to adjust a relative placement between said first ferrule and said second ferrule, wherein adjusting the relative placement between said first ferrule and said second ferrule changes attenuation of said attenuator, wherein said first ferrule includes a first lens at one end, and said second ferrule includes a second lens at an end thereof, and wherein said first lens faces to said second lens across a gap.

2. The attenuator of claim 1, wherein said base is a cylindrical housing.

3. The attenuator of claim 2, wherein said cylindrical housing includes first threads, and wherein said holder includes second threads engaged to said first threads so that said holder may be moved relative to said cylindrical housing by screwing said holder and said cylindrical housing further together or further apart.

4. The attenuator of claim 3, wherein said first threads are formed on an outer surface adjacent a first end of said cylindrical housing, and wherein said second threads are formed in an inner surface of said holder.

5. The attenuator of claim 4, further comprising:
   a jam nut having third threads formed on an inner surface thereof, wherein said third threads are engaged to said first threads, and wherein touching engagement between said jam nut and said holder stops said holder and said cylindrical housing from being further screwed together.

6. The attenuator of claim 4, further comprising:
   fourth threads formed on an outer surface of said cylindrical housing, adjacent to a second end of said cylindrical housing; and
   a cap having fifth threads formed on an inner surface thereof, wherein said fifth threads are engaged to said fourth threads, and wherein said cap holds said first ferrule in a fixed position relative to said cylindrical housing.

7. The attenuator of claim 6, wherein said first ferrule is a first cylinder and includes a first spring clip or o-ring encircling a first groove formed around a perimeter of said first cylinder, wherein said first spring clip or o-ring is captured between a portion of said cap and a portion of said cylindrical housing.

8. The attenuator of claim 1, wherein said holder is formed of two pieces screwed together to capture a portion of said second ferrule therebetween.

9. The attenuator of claim 8, wherein said second ferrule is a cylinder and includes a spring clip or o-ring encircling a groove formed around a perimeter of said cylinder, wherein said spring clip or o-ring is captured between said two pieces of said holder.

10. The attenuator of claim 1, further comprising:
    indicia on one of said base and said holder representing different levels of attenuation.

11. The attenuator of claim 10, further comprising:
    an indicator attached to the other of said base and said holder overlying said indicia.

12. The attenuator of claim 1, wherein said gap is made either larger or smaller as the relative placement between said first ferrule and said second ferrule is changed.

13. An attenuator for optical signals comprising:
    a base;
    a first optic fiber;
    a first ferrule holding said first optic fiber;
    a second optic fiber;
    a second ferrule holding said second optic fiber; and
    a holder moveably attached to said base, said holder engaging said second ferrule, such that said holder permits a user to adjust a relative placement between said first ferrule and said second ferrule, wherein adjusting the relative placement between said first ferrule and said second ferrule changes attenuation of said attenuator, wherein said first ferrule includes a first lens at one end attached to said first optic fiber, and said second ferrule includes a second lens at an end thereof attached to said second optic fiber, and wherein said first lens faces to said second lens across a gap.

14. The attenuator of claim 13, wherein said first optic fiber is attached to said first lens by a first epoxy, and said second optic fiber is attached to said second lens by a second epoxy.

15. The attenuator of claim 14, wherein said first epoxy has an index of refraction approximately between an index of refraction of said first optic fiber and an index of refraction of said first lens.

16. The attenuator of claim 13, where said first ferrule is a first ceramic cylinder with a bore through a center thereof through which said first optic fiber passes to adjoin said first lens.

17. The attenuator of claim 13, wherein said first lens is spherical and formed of sapphire.

18. The attenuator of claim 13, wherein said gap is made either larger or smaller as the relative placement between said first ferrule and said second ferrule is changed.

19. A method of assembling an optical signal attenuator comprising:
    attaching a first optic fiber to a first lens;
    attaching a second optic fiber to a second lens;
    attaching the first lens to a base;

attaching the second lens to the base so that the second lens faces to the first lens across a gap; and changing the relative placement of the first and second lens until a desired signal attenuation is achieved, wherein the first lens is attached to a first ferrule and the second lens is attached to a second ferrule, and wherein said step of changing the relative placement includes displacing the second ferrule.

20. The method of claim 19, wherein the second ferrule is attached to a holder and wherein said step of changing the relative placement includes screwing threads of the holder along threads of the base.

* * * * *